United States Patent
Ramaswamy et al.

(10) Patent No.: US 12,525,619 B2
(45) Date of Patent: Jan. 13, 2026

(54) FUEL CELL ELECTRODE AND FUEL CELL SYSTEM INCLUDING ZIRCONIUM-BASED DOPANTS

(71) Applicants: GM GLOBAL TECHNOLOGY OPERATIONS LLC, Detroit, MI (US); Cornell University, Ithaca, NY (US); Pajarito Powder, LLC, Albuquerque, NM (US)

(72) Inventors: Nagappan Ramaswamy, Rochester Hills, MI (US); Anusorn Kongkanand, Rochester Hills, MI (US); Swaminatha P. Kumaraguru, Rochester Hills, MI (US); Barr Zulevi, Ashland, MA (US); Geoff McCool, Albuquerque, NM (US); Zixiao Shi, Ithaca, NY (US); David A. Muller, Ithaca, NY (US)

(73) Assignees: GM Global Technology Operations LLC, Detroi, MI (US); Cornell University, Ithaca, NY (US); Pajarito Powder, Albuqueque, NM (US)

( * ) Notice: Subject to any disclaimer, the term of this patent is extended or adjusted under 35 U.S.C. 154(b) by 489 days.

(21) Appl. No.: 18/191,936

(22) Filed: Mar. 29, 2023

(65) Prior Publication Data
US 2025/0329754 A1    Oct. 23, 2025

(51) Int. Cl.
*H01M 4/92* (2006.01)
*H01M 4/88* (2006.01)

(52) U.S. Cl.
CPC ......... *H01M 4/921* (2013.01); *H01M 4/8882* (2013.01); *H01M 4/926* (2013.01)

(58) Field of Classification Search
CPC .... H01M 4/921; H01M 4/8882; H01M 4/926; B01J 23/42; B01J 21/066; B01J 21/18; B01J 35/33; B01J 35/643; B01J 35/651; B01J 35/653; B01J 37/084; B01J 37/088
USPC ......... 429/524; 502/182, 185, 339, 349, 101
See application file for complete search history.

(56) References Cited

U.S. PATENT DOCUMENTS

| | | | | |
|---|---|---|---|---|
| 5,641,723 | A | * | 6/1997 | Bonnemann ........... B01J 23/755 502/326 |
| 7,132,385 | B2 | * | 11/2006 | Pak ....................... H01M 4/926 502/185 |
| 9,634,331 | B2 | * | 4/2017 | Serov ....................... B01J 23/70 |
| 2012/0178018 | A1 | * | 7/2012 | Querner .................. H01M 4/90 429/535 |
| 2015/0303487 | A1 | * | 10/2015 | Kamai .................. C25B 11/043 502/101 |

FOREIGN PATENT DOCUMENTS

| | | | | |
|---|---|---|---|---|
| CN | 114335572 | A * | 4/2022 | ............. H01M 4/88 |
| CN | 116742017 | A * | 9/2023 | .......... H01M 4/8882 |
| CN | 118738411 | A * | 10/2024 | ............. H01M 8/10 |
| KR | 101982744 | B1 * | 9/2019 | ............. H01M 4/92 |

* cited by examiner

Primary Examiner — Patricia L. Hailey

(57) ABSTRACT

An electrode for a fuel cell system is provided. The electrode includes a carbon support. Platinum-based catalyst nanoparticles are dispersed on the carbon support. Zirconium-based dopants are disposed on the carbon support. In one example, a fuel cell system includes the electrode as a first electrode and further includes a second electrode and a fuel cell membrane. The fuel cell membrane is disposed between the first and second electrodes.

20 Claims, 4 Drawing Sheets

FUEL CELL ELECTRODE AND FUEL CELL SYSTEM INCLUDING ZIRCONIUM-BASED DOPANTS

STATEMENT REGARDING FEDERALLY SPONSORED RESEARCH

This disclosure was made with Government support under Contract No. US; DE-EE0008821; HD Truck MEA awarded by the Department of Energy. The Government has certain rights in the disclosure.

INTRODUCTION

The disclosure generally relates to a fuel cell electrode(s) and a fuel cell system including a zirconium doped catalyst layer, and a method for making such a fuel cell electrode.

A fuel cell is an electrochemical device generally composed of multiple anode electrodes that receive hydrogen ($H_2$), multiple cathode electrodes that receive oxygen ($O_2$), and multiple electrolytes or an electrolyte solution interposed between each anode and cathode. An electrochemical reaction is induced to oxidize hydrogen molecules at the anode to generate protons ($H^+$), which are then passed through the electrolyte for reduction at the cathode with an oxidizing agent, such as oxygen. This reaction creates electrons at the anode, some of which are redirected through a load, such as a vehicle's traction motor or a non-vehicular load requiring stationary power generation, before being sent to the cathode. Such a fuel cell can be used in combination with other fuel cells to form a fuel cell stack. This stack of fuel cells or fuel cell stack can be electrically connected to each other, for example, in series, such that the voltage supplied by each fuel cell is added to the next, such that a total voltage supplied by the fuel cell stack is the sum of the voltages of each of the stacked fuel cells.

Hybrid electric and fully electric (collectively "electric-drive") powertrains take on various architectures, some of which utilize a fuel cell system to supply power for one or more electric traction motors. One of the factors that determines the commercial viability of a fuel cell is its durability. A fuel cell for an automotive vehicle with an electric-drive powertrain may be tasked to provide at least 30,000 hours of service. Such high durability requirements may present a challenge to one or more components of a fuel cell.

SUMMARY

An electrode for a fuel cell system is provided. The electrode includes a carbon support, platinum-based catalyst nanoparticles dispersed on the carbon support, and zirconium-based dopants disposed on the carbon support.

In some embodiments, the carbon support is a mesoporous carbon support having a plurality of pores formed therein with an average pore diameter of from about 2 to about 100 nm.

In some embodiments, the carbon support includes carbon particles having an average particle size of from about 50 to about 800 nm.

In some embodiments, the platinum-based catalyst nanoparticles comprise platinum metal or a platinum alloy.

In some embodiments, the zirconium-based dopants include a first plurality of zirconium-based dopants that are dispersed on the carbon support between the platinum-based catalyst nanoparticles.

In some embodiments, the first plurality of zirconium-based dopants is chosen from zirconium atoms, zirconium oxide, zirconium carbide, or combinations thereof.

In some embodiments, the first plurality of zirconium-based dopants is chosen from zirconium oxide, zirconium carbide, or combinations thereof and has an average particle size of from about 1 to about 3 nm.

In some embodiments, the zirconium-based dopants further include a second plurality of zirconium-based dopants that are dispersed on the platinum-based catalyst nanoparticles.

In some embodiments, the second plurality of zirconium-based dopants include zirconium oxide.

In some embodiments, the second plurality of zirconium-based dopants has an average particle size of from about 0.1 to about 1 nm.

In some embodiments, the carbon support, the platinum-based catalyst nanoparticles, and the zirconium-based dopants together define a catalyst layer. The zirconium-based dopants are present in the catalyst layer in an amount of from about 0.50 to about 3.0 wt. %, based on the weight of the carbon support.

Some embodiments, the carbon support, the platinum-based catalyst nanoparticles, and the zirconium-based dopants together define a catalyst layer. The platinum-based catalyst nanoparticles are present in the catalyst layer in an amount of from about 30 to about 50 wt. %, based on the weight of the carbon support.

In some embodiments, the platinum-based catalyst nanoparticles have an average particle size of from about 1.5 to about 4.0 nm.

In some embodiments, the carbon support is free of nitrogen.

According to an alternative embodiment, a fuel cell system includes a first electrode and a second electrode. The second electrode includes a carbon support, platinum-based catalyst nanoparticles dispersed on the carbon support, and zirconium-based dopants disposed on the carbon support. A fuel cell membrane disposed between the first and second electrodes.

According to an alternative embodiment, a method for making an electrode for a fuel cell system is provided. The method includes combining an organic carbon-forming precursor, a zirconium salt dopant-forming precursor, and a pore-forming agent to form a precursor mixture. The precursor mixture is converted to a zirconium-doped carbon support. Platinum-based catalyst nanoparticles are dispersed on the zirconium-doped carbon support.

In some embodiments, inverting includes heat treating the precursor mixture at first processing conditions to pyrolyze the organic carbon-forming precursor and the zirconium salt dopant-forming precursor to form the zirconium-doped carbon support that includes zirconium-based dopants and that has pores formed therein defined by the pore-forming agent. The pore-forming agent is removed from the pores of the zirconium-doped carbon support.

In some embodiments, heat treating the precursor mixture at the first processing conditions includes exposing the precursor mixture to a temperature of from about 800 to about 1500° C. for a time of from about 30 seconds to about 4 hours.

In some embodiments, the method further includes optionally depositing additional zirconium-based dopants on the zirconium-doped carbon support. The zirconium-doped carbon support is heat treated at second processing conditions to arrange a portion of the zirconium-based dopants on the platinum-based catalyst nanoparticles after removing the pore-forming agent from the pores of the zirconium-doped carbon support.

In some embodiments, heat treating the zirconium-doped carbon support at the second processing conditions includes exposing the zirconium-doped carbon support to a temperature of from about 300 to about 1000° C. for a time of from about 30 seconds to about 4 hours.

The above features and advantages and other features and advantages of the present disclosure are readily apparent from the following detailed description of the best modes for carrying out the disclosure when taken in connection with the accompanying drawings.

DETAILED DESCRIPTION

Figure 1:
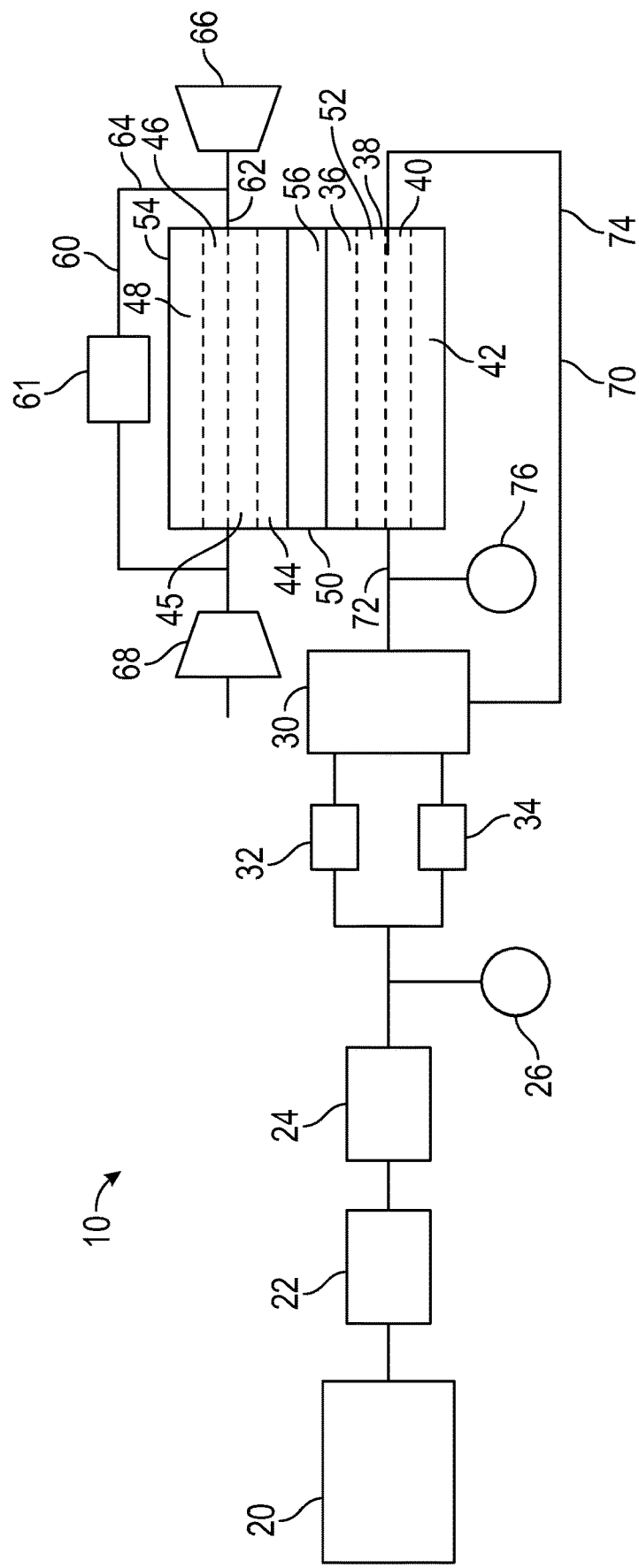
FIG. 1 schematically illustrates a fuel cell system including a fuel cell stack according to an embodiment of the disclosure.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Unless specifically stated from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, the numerical values provided herein are modified by the term "about."

The present disclosure relates to electrodes and fuel cell systems including a catalyst layer (also referred to herein as an electrode substrate) and methods for making such electrodes. Fuel cells may experience challenges such as decreased catalyst electrochemical surface area (ECSA) along the electrode substrate (for example cathode substrate or anode substrate) which may result in decreased mass activity and cell voltage. For example, many electrode substrates include catalyst nanoparticles that are dispersed or spread out (spaced apart) on a support. During fuel-cell operation, these catalyst nanoparticles can coalesce or come together (agglomerate) to effectively decrease the catalyst electrochemical surface area available for the reduction reaction side of the fuel cell's redox reactions, thereby decreasing mass activity and cell voltage over time.

The present disclosure generally relates to the addition of zirconium (Zr)-based dopants to the electrode substrate in a fuel cell system where the zirconium-based dopants prevent or mitigate a decrease in catalyst electrochemical surface area during operation of the fuel cell to help maintain mass activity and cell voltage over time for enhanced durability. In particular, in accordance with one or more embodiments of the disclosure, a fuel cell system includes an anode, a cathode, and a fuel cell membrane that is disposed between the anode and the cathode. In one embodiment, the cathode (or alternatively, the anode) includes a carbon support and platinum-based catalyst nanoparticles that are dispersed on the carbon support. Zirconium-based dopants are disposed on the carbon support, for example, the zirconium-based dopants are dispersed directly on the carbon support between the platinum-based catalyst nanoparticles and/or dispersed directly on the platinum-based catalyst nanoparticles, which are disposed on the carbon support. Together, the carbon support, the platinum-based catalyst nanoparticles, and the zirconium-based dopants form the cathode substrate.

In accordance with one or more embodiments of the disclosure, it has been found that the presence of the zirconium-based dopants in the electrode substrate (e.g., cathode substrate and/or anode substrate) helps prevent or otherwise mitigates the platinum-based catalyst nanoparticles from coalescing or coming together during fuel cell operation to provide a more catalytically stable electrode substrate. That is, the presence of the zirconium-based dopants on the carbon support and/or on and around the platinum-based catalyst nanoparticles helps prevent or decrease the rate of migration of the platinum-based catalyst nanoparticles towards each other. This helps maintain the available catalyst electrochemical surface area of the catalyst and the fuel cell's mass activity and cell voltage over time, thereby improving durability of the fuel cell system.

Referring now to the drawings, wherein like numerals indicate like parts in the several views, a fuel cell system including a cathode, and a method for making a cathode for a fuel cell system are shown and described herein. FIG. 1 is a schematic perspective view of a fuel cell system 10 according to an embodiment of the disclosure. As illustrated, the fuel cell system 10 includes a fuel cell stack 50, a hydrogen storage tank 20, a fuel injector 32 and a fuel injector 34 supplying flows of hydrogen gas to an ejector device 30. For simplicity, the fuel cell stack 50 is illustrated as a single fuel cell including an anode 52 and a cathode 54 separated by a fuel cell membrane 56 (or polymer electrolyte membrane (PEM)). However, it is to be understood that the fuel cell system 10 can include a plurality of fuel cell stacks 50 including a plurality of pairs of anodes 52 and cathodes 54.

As viewed in the drawing, the fuel cell membrane or PEM 56 is sandwiched or otherwise disposed between the anode 52 and the cathode 54. Proceeding outward from the PEM 56, the anode 52 includes a catalyst layer 36 (or anode substrate), a micro-porous layer 38, a gas diffusion layer 40 and a bipolar plate 42. Similarly, proceeding outward from the PEM 56, the cathode 54 includes a catalyst layer 44 (or cathode substrate), a micro-porous layer 45, a gas diffusion layer 46 and a bipolar plate 48.

An anode gas loop 70 including a hydrogen gas flow is provided to the anode 52. A cathode gas subsystem 60 including a compressed air flow is provided to the cathode 54. As described herein, the fuel cell stack 50 utilizes the hydrogen gas flow at the anode 52 and the compressed air at the cathode 54 to produce electrical energy for use by a vehicle or system equipped with the fuel cell stack 50.

Hydrogen gas is supplied by hydrogen storage tank 20 at high pressure. Shut-off valve 22 is provided and is capable of selectively permitting or not permitting hydrogen gas from the hydrogen storage tank 20 to flow to a remainder of the fuel cell system 10. Pressure regulator 24 is provided which controls and steps down the pressure of hydrogen gas from the high pressure delivered by hydrogen storage tank 20 to a medium pressure to be delivered to the fuel injector 32 and the fuel injector 34. A pressure sensor 26 is provided between the pressure regulator 24 and the two fuel injectors 32, 34.

The fuel injector 32 and the fuel injector 34 are operable to selectively open and supply hydrogen gas to the anode gas loop 70 and to selectively close and prohibit hydrogen gas from flowing into the anode gas loop 70. Hydrogen gas is delivered to the fuel injector 32 and the fuel injector 34 at medium pressure. The fuel injector 32 and the fuel injector 34 supply hydrogen gas to the anode gas loop 70 at a low pressure by cycling between an open state and a closed state, opening to increase pressure to a maximum desired anode gas loop pressure, closing when the pressure within the anode gas loop 70 reaches the maximum desired anode gas loop pressure, and opening again when the pressure within the anode gas loop 70 reaches a minimum desired anode gas loop pressure. By opening the fuel injector 32 and the fuel injector 34 when the pressure within the anode gas loop 70 reaches the minimum desired anode gas loop pressure and by closing the fuel injector 32 and the fuel injector 34 when the pressure within the anode gas loop 70 reaches the maximum desired anode gas loop pressure, the fuel injector 32 and the fuel injector 34 may be used to maintain the pressure within the anode gas loop 70 within a desired low pressure range.

The ejector device 30 is a device useful to provide hydrogen gas from the fuel injector 32 and from the fuel injector 34 into the anode gas loop 70. The ejector device 30 includes a venturi configuration. Hydrogen gas flowing through the ejector device 30 flows past a venturi tube within the ejector device 30. The anode gas loop 70 includes an upstream portion 72 upstream of the anode 52 and a downstream portion 74 downstream of the anode 52. The upstream portion 72 includes a high concentration of hydrogen gas. As the hydrogen gas goes through the anode 52, a significant portion of the hydrogen gas may be consumed by the anode 52. However, a lower concentration of hydrogen gas may remain in the downstream portion 74. The downstream portion 74 is connected to the venturi tube of the ejector device 30, such that the movement of hydrogen gas from the fuel injector 32 and the fuel injector 34, through the ejector device 30, and into the upstream portion 72 flows past the venturi device and draws gas from the downstream portion 74 into the gas flowing into the upstream portion 72. In this way, gas from the downstream portion 74 is recycled through the anode 52. A pressure sensor 76 is disposed to monitor a pressure within the upstream portion 72.

Water as a by-product of the chemical reaction of the fuel cell stack 50 may exit the anode 52. The downstream portion 74 may include an anode water separator and an anode drain valve useful to drain the water from the downstream portion 74.

Air is provided to the cathode 54 to supply oxygen for the fuel cell stack reaction. An air compressor 66 is provided drawing in ambient air and providing a pressurized flow of air through the cathode gas subsystem 60. The cathode gas subsystem 60 includes a cathode reactant portion 62 and a cathode bypass portion 64. The cathode reactant portion 62 provides a flow of air to the cathode 54. A bypass valve 61 is connected to the cathode bypass portion 64, and control of the bypass valve 61 may be used to control how much air flows through the cathode bypass portion 64 and how much air flows through the cathode reactant portion 62. This control of how much air flows through the cathode reactant portion 62 may be important to controlling the reaction of the fuel cell stack 50. Air exits through an air expander device 68.

During operation of the fuel cell stack 50, as briefly mentioned above, hydrogen gas enters channels formed in the anode bipolar plate 42 and flows across the anode gas diffusion layer 40, the micro-porous layer 38, and the catalyst layer 36. Likewise, oxygen or air enters channels formed in the cathode bipolar plate 48 and flow across the cathode gas diffusion layer 46, the micro-porous layer 45, and the catalyst layer 44. As the hydrogen gas that enters the anode layers is oxidized, the hydrogen atoms' electrons are stripped off and flow in an electrical circuit, for example through a load (not shown), from the anode bipolar plate 42 to the cathode bipolar plate 48. Meanwhile, the remaining portions of the oxidized hydrogen atoms (which are protons) are transported across the fuel cell stack 50 from the anode 52 side to the cathode 54 side, where they combine with some of the incoming air and the anode-derived electrons which were introduced to the electrical circuit.

Figure 2:
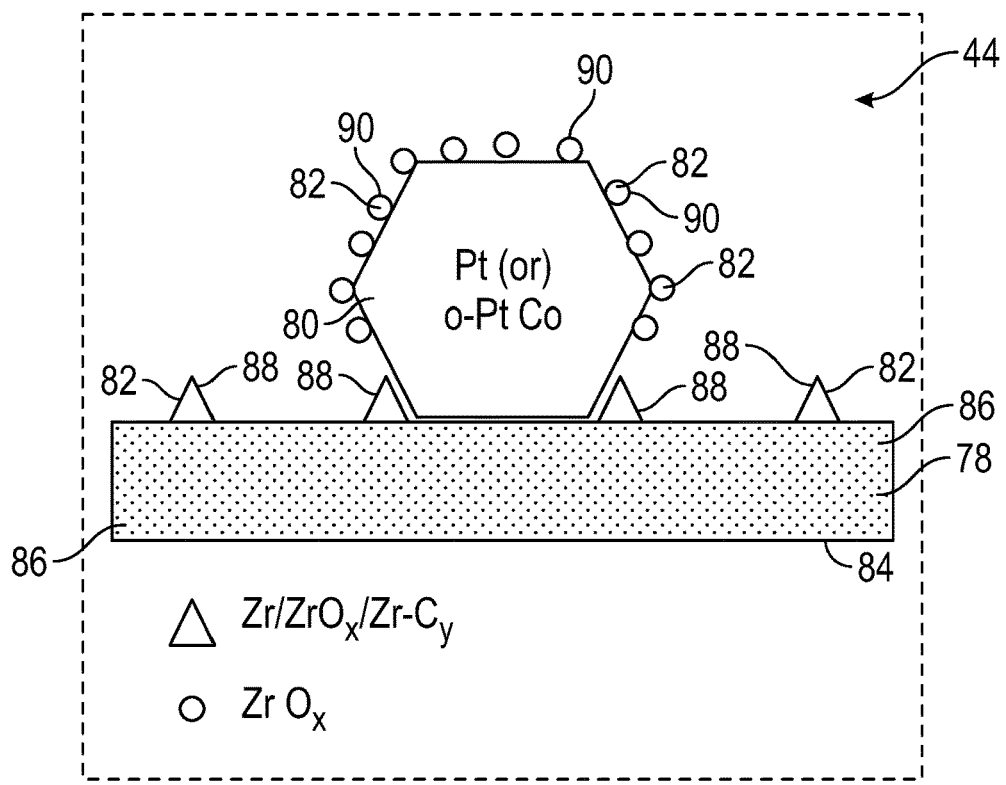
FIG. 2 schematically illustrates a portion of an electrode of the fuel cell stack depicted in FIG. 1 including a zirconium doped catalyst layer according to an embodiment of the disclosure.

FIG. 2 schematically illustrates the catalyst layer 44 of the cathode 54 of the fuel cell stack. Although FIG. 2 illustrates the catalyst layer 44 of the cathode 54, it is to be understood that FIG. 2 also more generally illustrates a catalyst layer of an electrode (e.g., cathode and/or anode), for example, it is to be understood that FIG. 2 also illustrates the catalyst layer 36 of the anode 52. As such, the following description not only describes the catalyst layer 44 of the cathode 54 but it is to be understood that it also describes the catalyst layer 36 of the anode 52.

Referring to FIGS. 1-2, in one or more embodiments of the disclosure, the catalyst layer 44 is a zirconium doped catalyst layer that catalyzes the reduction of protons ($H^+$) passing from the anode 52 side with an oxidizing agent, such as oxygen from air. As illustrated, the catalyst layer 44 includes a carbon support 78, platinum-based catalyst nanoparticles 80 that dispersed on the carbon support 78, and zirconium-based dopants 82 disposed on the carbon support 78.

In an embodiment of the disclosure, the carbon support 78 is formed of carbon particles having an average particle size of from about 50 to about 800 nm. In an embodiment of the disclosure, the carbon support 78 is a mesoporous carbon support 84 having a plurality of pores 86 formed therein with an average pore diameter of from about 2 to about 100 nm, for example about 2 to about 50 nm. In an exemplary embodiment and as will be discussed in further detail below, the carbon support 78 is formed by a process that produces the mesoporous carbon support 84 that is free of nitrogen. In particular, in one or more embodiments of the disclosure, the carbon support 84 (e.g., zirconium doped carbon support) does not contain any nitrogen heteroatom(s) or zirconium-nitrogen present in the carbon support.

In one or more embodiments of the disclosure, the platinum-based catalyst nanoparticles 80 are formed of a platinum-based material such as platinum (Pt) metal and/or a platinum alloy, for example a Pt-based alloy that further includes cobalt (Co) and/or nickel (Ni) and/or other alloying elements. In an embodiment, the platinum-based catalyst nanoparticles 80 have an average particle size of from about 1.5 to about 4.0 nm.

As illustrated, the zirconium-based dopants 82 include a plurality 88 of zirconium-based dopants 82 that are dispersed on the carbon support 78 between the platinum-based catalyst nanoparticles 80, and a plurality 90 of zirconium-based dopants 82 that are dispersed on the platinum-based catalyst nanoparticles 80. In one or more embodiments of the disclosure, the plurality 88 of zirconium-based dopants 82 is chosen from zirconium atoms, zirconium oxide, and/or zirconium carbide. In an embodiment, an average particle size of the zirconium oxide and/or zirconium carbide, if present, is from about 1 to about 3 nm. In one or more embodiments of the disclosure, the plurality 90 of zirconium-based dopants 82 present on the platinum-based catalyst nanoparticles 80 is or includes zirconium oxide and has an average particle size of from about 0.1 to about 1 nm.

As discussed above, the carbon support 78, the platinum-based catalyst nanoparticles 80, and the zirconium-based dopants 82 together define the catalyst layer 44. In one or more embodiments of the disclosure, the zirconium-based dopants 82 are present in the catalyst layer 44 in an amount of from about 0.50 to about 3.0 wt. %, based on the weight of the carbon support 78. In an embodiment, the platinum-based catalyst nanoparticles 80 are present in the catalyst layer 44 in an amount of from about 30 to about 50 wt. %, based on the weight of the carbon support 78.

Figure 4:
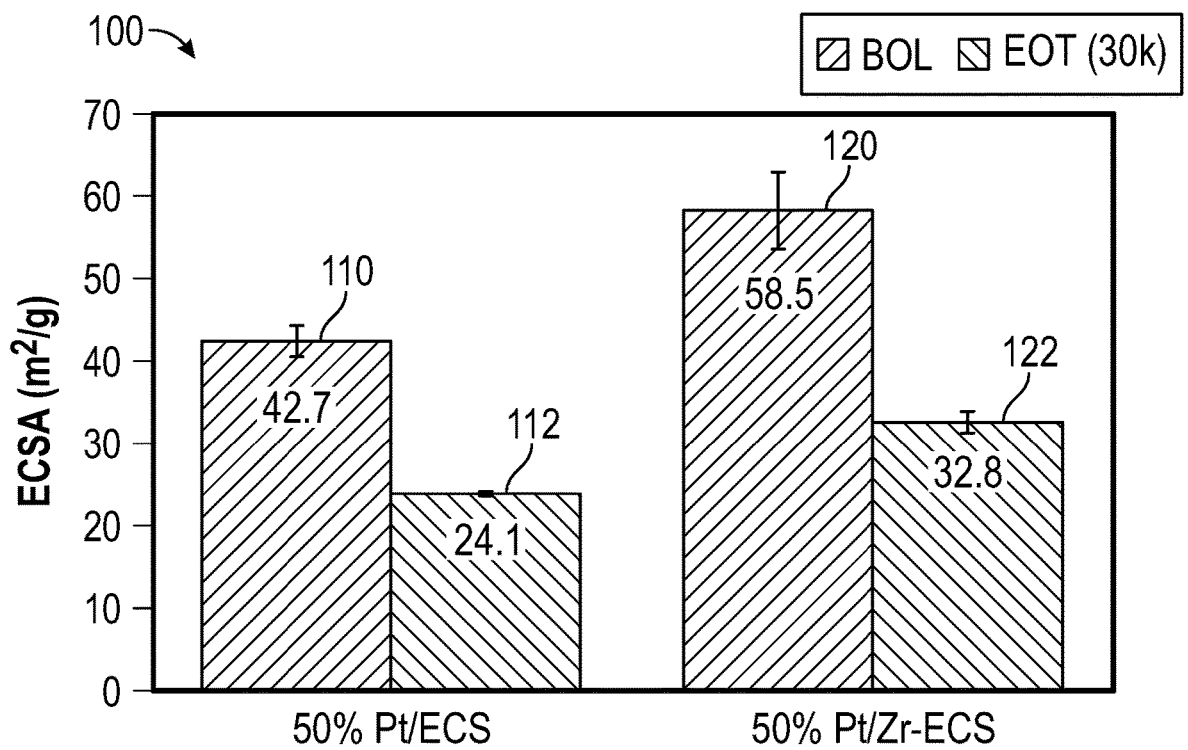
FIG. 4 graphically illustrates a change in catalyst electrochemical surface area (ECSA) through cyclic testing for both a baseline fuel cell including an electrode with a baseline catalyst layer and a fuel cell including an electrode with an exemplary zirconium doped catalyst layer according to an embodiment of the disclosure.

Referring to FIG. 4, graph 100 is illustrated including a vertical axis illustrating an ECSA value for a cathode substrate in meters$^2$/gram. A horizontal axis includes four different samples: sample 110, an initial comparative baseline sample; sample 112, the comparative baseline sample after the cycling test; sample 120, an initial sample including the exemplary zirconium-based dopants; and sample 122, the sample including the exemplary zirconium-based dopants after the cycling test. Comparing sample 110 to sample 112, one may see degradation of the cathode substrate from an initial ECSA value of 42.7 meters$^2$/gram to 24.1 meters$^2$/gram. Comparing sample 120 to sample 122, one may see degradation of the cathode substrate from an initial ECSA value of 58.5 meters$^2$/gram to 32.8 meters$^2$/gram. The addition of the exemplary zirconium-based dopants improved durability and performance of the cathode substrate by providing excellent electrochemical surface area retention.

Figure 5:
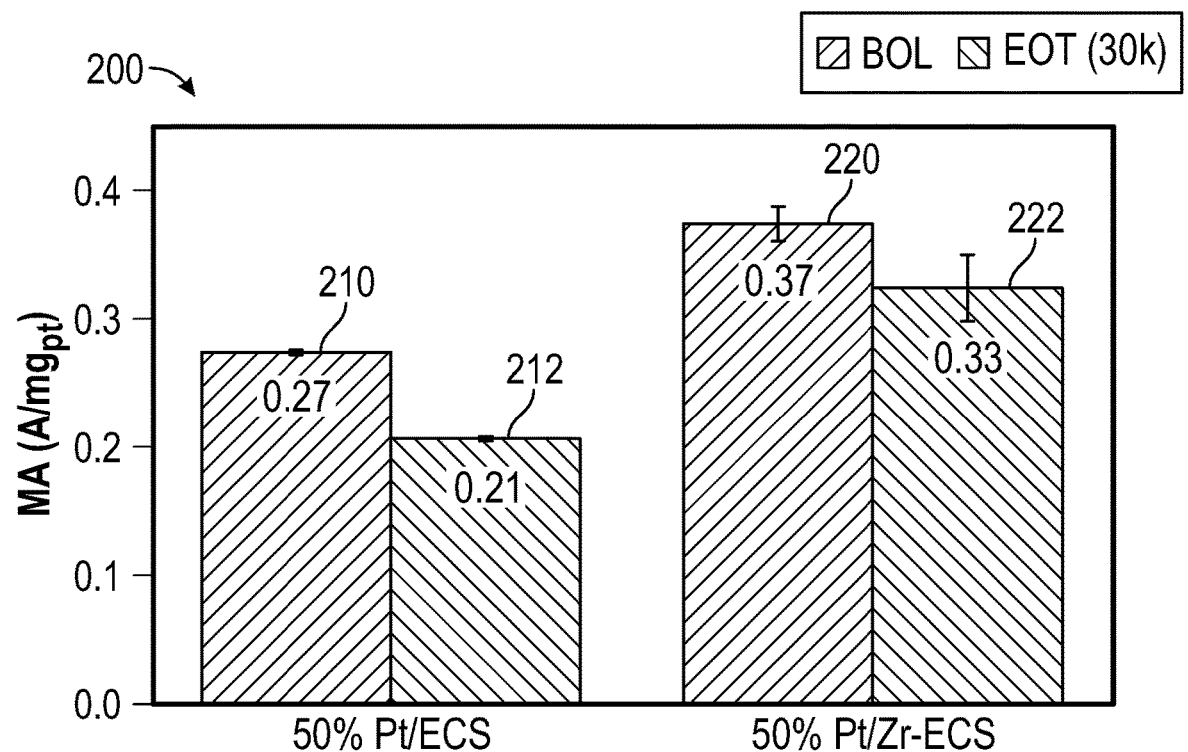
FIG. 5 graphically illustrates a change in mass activity through cyclic testing for both a baseline fuel cell including an electrode with a baseline catalyst layer and a fuel cell including an electrode with an exemplary zirconium doped catalyst layer according to an embodiment of the disclosure.

FIG. 5 graphically illustrates a change in mass activity through cyclic testing for both a comparative baseline fuel cell cathode substrate and a fuel cell cathode substrate including the exemplary zirconium doped catalyst layer. Mass activity may be described as current per unit of mass or current density at a specified voltage normalized to an active material mass loading. Graph 200 is illustrated including a vertical axis illustrating a mass activity value for a cathode substrate in Amperes/milligram of platinum. A horizontal axis includes four different samples from the test: sample 210, an initial comparative baseline sample; sample 212, the comparative baseline sample after the cycling test; sample 220, an initial sample including the exemplary zirconium-based dopants; and sample 222, the sample including the exemplary zirconium-based dopants after the cycling test. Comparing sample 210 to sample 212, one may see a decreased initial mass activity value of 0.27 Amperes per milligram of platinum to 0.21 Amperes per milligram of platinum. Comparing sample 220 to sample 222, one may see a decreased initial mass activity value of 0.37 Amperes per milligram of platinum to 0.33 Amperes per milligram of platinum. The addition of the exemplary zirconium-based dopants improved durability and performance of the cathode substrate by providing excellent mass activity retention.

Figure 3:
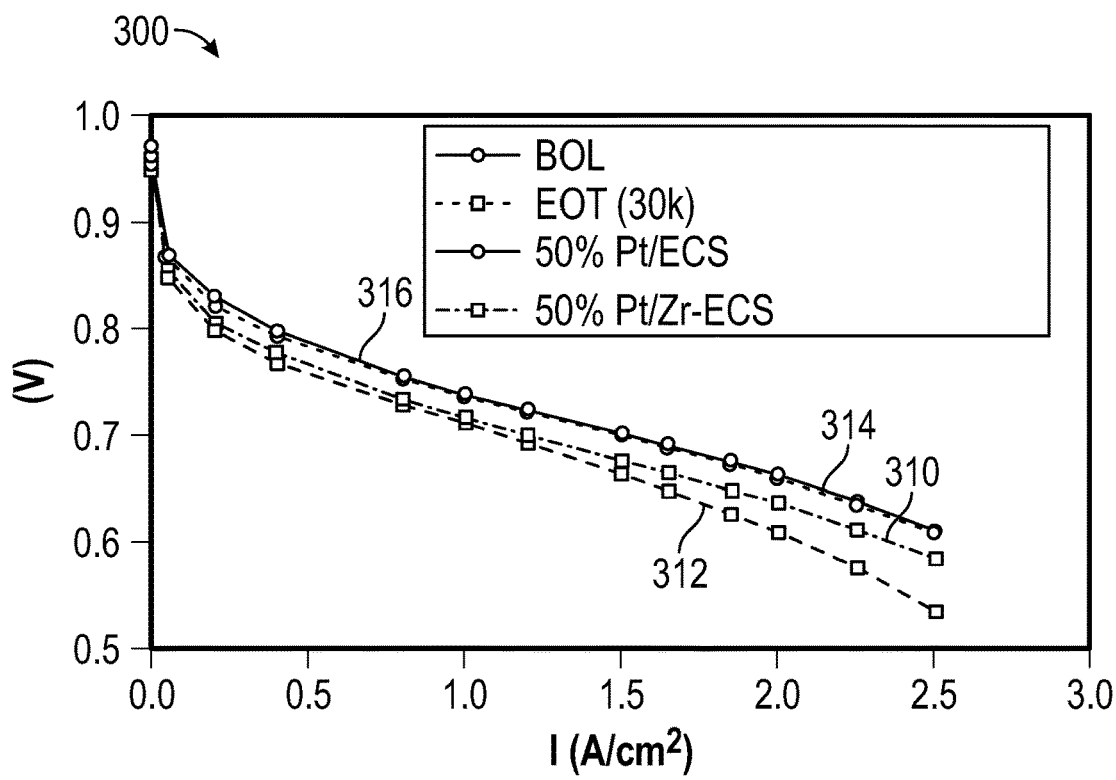
FIG. 3 graphically illustrates hydrogen/air polarization curves of fuel cell voltage as a function of current density at beginning of life (BOL) and end of test (EOT) for both a baseline fuel cell including an electrode with a baseline catalyst layer and a fuel cell including an electrode with an exemplary zirconium doped catalyst layer according to an embodiment of the disclosure.

FIG. 3 graphically illustrates hydrogen/air polarization curves of fuel cell voltage as a function of current density at beginning of life (BOL) and after cyclic testing (i.e., end of test (EOT)) for both a baseline fuel cell including a cathode with a baseline catalyst layer and a fuel cell including a cathode with an exemplary zirconium doped catalyst layer according to an embodiment of the disclosure. Graph 300 is illustrated including a vertical axis illustrating cell voltage in volts (V) and a horizontal axis illustrating current density in Amperes/(centimeter)^2. Four different samples were tested: sample 310, an initial comparative baseline sample; sample 312, the comparative baseline sample after the cycling test; sample 314, the initial sample including the exemplary zirconium-based dopants; and sample 316, the sample including the exemplary zirconium-based dopants after the cycling test. Comparing samples 310 and 312, one may see substantial degradation of the fuel cell voltage after the cycling test. Comparing samples 314 and 316, one may see little to no degradation of the fuel cell voltage after the cycling test, as test data lines for samples 314 and 316 substantially overlie each other. The addition of the exemplary zirconium-based dopants improved durability and performance of the cathode substrate by providing excellent fuel cell voltage as a function of current density retention.

Thus, the benefits of the disclosed zirconium-based dopants include lower degradation of the catalyst electrochemical surface area which results in improved mass activity, and cell voltage performance and durability over lifetime.

Figure 6:
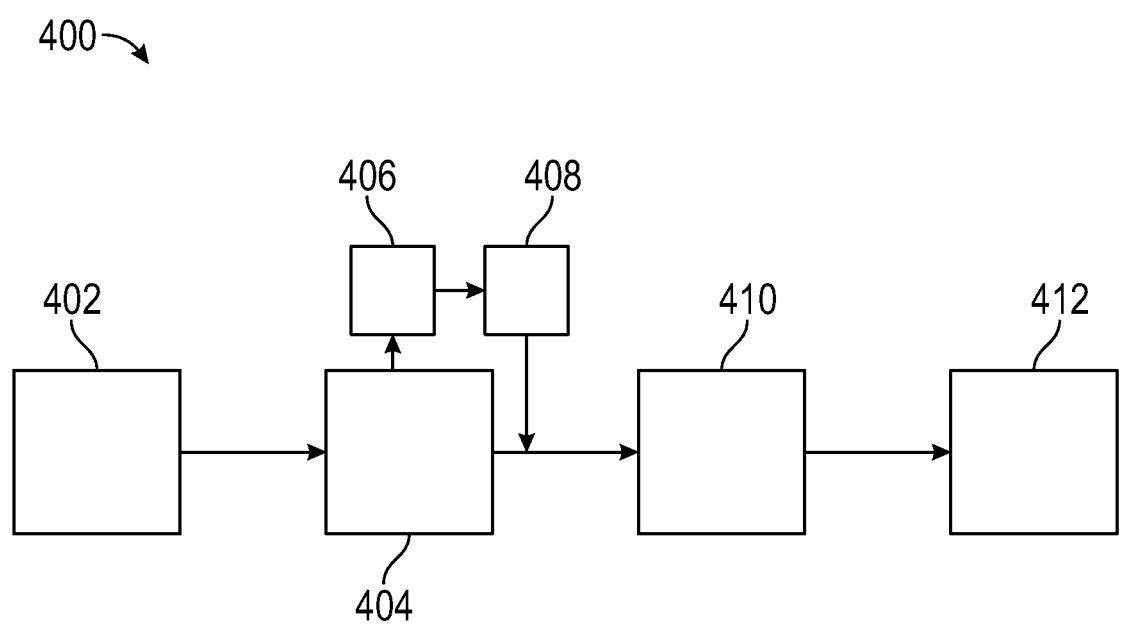
FIG. 6 is a flowchart of a method for making an electrode for a fuel cell system according to one or more embodiments of the disclosure.

Referring to FIG. 6, a method 400 for making an electrode for a fuel cell is provided. In particular, the method 400 includes forming an engineered carbon support (ECS) having a mesoporous structure doped with nitrogen-free, zirconium-based dopants as described herein. A non-limiting example of an ECS having a mesoporous structure and a method for making such an ECS are described in U.S. Pat. No. 9,634,331 ("the '331 Patent"), filed on Jan. 21, 2015, which is licensed to an assignee of the present application and is hereby incorporated by reference in its entirety for all purposes. In particular, the '331 Patent describes various organic carbon-forming precursors, pore-forming agents, and methods for forming the ECS from the carbon-forming precursors and pore-forming agents to form a mesoporous structure in the carbon support.

As illustrated, the method 400 includes combining (STEP 402) an organic carbon-forming precursor, a zirconium salt dopant-forming precursor, and a pore-forming agent to form a precursor mixture. The method 400 continues by converting (STEP 404) the precursor mixture to a zirconium-doped carbon support. In particular, the precursor mixture is heat treated (STEP 406) at first processing conditions to pyrolyze the organic carbon-forming precursor and the zirconium salt dopant-forming precursor to form the zirconium-doped carbon support having pores formed therein that are defined by the pore-forming agent. In an embodiment, the first processing conditions includes exposing the precursor mixture to a temperature of from about 800 to about 1500° C., such as 1300 to about 1500° C. for a time of from about 30 seconds to about 4 hours, such as about 30 minutes to about 4 hours, or alternatively, about 30 seconds to about 30 minutes. The pore-forming agent is then removed (STEP 408) from the pores of the zirconium-doped carbon support.

The method 400 continues by dispersing (STEP 410) platinum-based catalyst nanoparticles on the zirconium-doped carbon support. In an exemplary embodiment, the method 400 includes adding another or additional about 2.0 to about 2.5% zirconium in the platinum-based catalyst to arrive at a total zirconium-based dopants concentration of about 3.0%.

The method 400 continues by heat treating (STEP 412) the zirconium-doped carbon support at second processing conditions to arrange a portion of the zirconium-based dopants on the platinum-based catalyst nanoparticles. The second processing conditions include exposing the zirconium-doped carbon support to a temperature of from about 300 to about 1000° C., such as about 600 to about 1000° C. for a time of from about 30 seconds to about 4 hours, such as about 45 seconds to about 25 minutes.

While the best modes for carrying out the disclosure have been described in detail, those familiar with the art to which this disclosure relates will recognize various alternative designs and embodiments for practicing the disclosure within the scope of the appended claims.

What is claimed is:

1. An electrode for a fuel cell system, the electrode comprising:
   a carbon support;
   platinum-based catalyst nanoparticles dispersed on the carbon support; and
   zirconium-based dopants disposed on the carbon support;
   wherein the zirconium-based dopants comprise a first plurality of zirconium-based dopants that are dispersed on the carbon support between the platinum-based catalyst nanoparticles; and
   wherein the zirconium-based dopants further comprise a second plurality of zirconium-based dopants that are dispersed on the platinum-based catalyst nanoparticles.

2. The electrode of claim 1, wherein the carbon support is a mesoporous carbon support having a plurality of pores formed therein with an average pore diameter of from about 2 to about 100 nm.

3. The electrode of claim 1, wherein the carbon support comprises carbon particles having an average particle size of from about 50 to about 800 nm.

4. The electrode of claim 1, wherein the platinum-based catalyst nanoparticles comprise platinum metal or a platinum alloy.

5. The electrode of claim 1, wherein the first plurality of zirconium-based dopants is chosen from zirconium atoms, zirconium oxide, zirconium carbide, or combinations thereof.

6. The electrode of claim 5, wherein the first plurality of zirconium-based dopants is chosen from zirconium oxide, zirconium carbide, or combinations thereof and has an average particle size of from about 1 to about 3 nm.

7. The electrode of claim 1, wherein the second plurality of zirconium-based dopants comprises zirconium oxide.

8. The electrode of claim 1, wherein the second plurality of zirconium-based dopants has an average particle size of from about 0.1 to about 1 nm.

9. The electrode of claim 1, wherein the carbon support, the platinum-based catalyst nanoparticles, and the zirconium-based dopants together define a catalyst layer, and wherein the zirconium-based dopants are present in the catalyst layer in an amount of from about 0.50 to about 3.0 wt. %, based on the weight of the carbon support.

10. The electrode of claim 1, wherein the carbon support, the platinum-based catalyst nanoparticles, and the zirconium-based dopants together define a catalyst layer, and wherein the platinum-based catalyst nanoparticles are present in the catalyst layer in an amount of from about 30 to about 50 wt. %, based on the weight of the carbon support.

11. The electrode of claim 1, wherein the platinum-based catalyst nanoparticles have an average particle size of from about 1.5 to about 4.0 nm.

12. The electrode of claim 1, wherein the carbon support is free of nitrogen.

13. A fuel cell system comprising:
   a first electrode;
   a second electrode comprising:
      a carbon support;
      platinum-based catalyst nanoparticles dispersed on the carbon support; and
      zirconium-based dopants disposed on the carbon support;
      wherein the zirconium-based dopants comprise a first plurality of zirconium-based dopants that are dispersed on the carbon support between the platinum-based catalyst nanoparticles; and
      wherein the zirconium-based dopants further comprise a second plurality of zirconium-based dopants that are dispersed on the platinum-based catalyst nanoparticles; and
   a fuel cell membrane disposed between the first and second electrodes.

14. The fuel cell system of claim 13, wherein the first plurality of zirconium-based dopants is chosen from zirconium atoms, zirconium oxide, zirconium carbide, or combinations thereof.

15. The fuel cell system of claim 13, wherein the second plurality of zirconium-based dopants comprises zirconium oxide.

16. A method for making an electrode for a fuel cell system, the method comprising:
   combining an organic carbon-forming precursor, a zirconium salt dopant-forming precursor, and a pore-forming agent to form a precursor mixture;
   converting the precursor mixture to a zirconium-doped carbon support; and
   dispersing platinum-based catalyst nanoparticles on the zirconium-doped carbon support.

17. The method of claim 16, wherein converting comprises:
   heat treating the precursor mixture at first processing conditions to pyrolyze the organic carbon-forming precursor and the zirconium salt dopant-forming precursor to form the zirconium-doped carbon support that includes zirconium-based dopants and that has pores formed therein defined by the pore-forming agent; and
   removing the pore-forming agent from the pores of the zirconium-doped carbon support.

18. The method of claim 17, wherein heat treating the precursor mixture at the first processing conditions includes exposing the precursor mixture to a temperature of from about 800 to about 1500° C. for a time of from about 30 seconds to about 4 hours.

19. The method of claim 17, further comprising:
optionally depositing additional zirconium-based dopants on the zirconium-doped carbon support; and
heat treating the zirconium-doped carbon support at second processing conditions to arrange a portion of the zirconium-based dopants on the platinum-based catalyst nanoparticles after removing the pore-forming agent from the pores of the zirconium-doped carbon support.

20. The method of claim 19, wherein heat treating the zirconium-doped carbon support at the second processing conditions includes exposing the zirconium-doped carbon support to a temperature of from about 300 to about 1000° C. for a time of from about 30 seconds to about 4 hours.

* * * * *